(12) United States Patent
Sanders et al.

(10) Patent No.: US 8,230,609 B1
(45) Date of Patent: Jul. 31, 2012

(54) SURVEY POLE POSITIONING SYSTEM

(75) Inventors: Brent L. Sanders, Evanston, WY (US); David R. Wolters, Orem, UT (US); David B. Peterson, Evanston, WY (US)

(73) Assignee: Cook-Sanders Associates, Inc., Salt Lake City, UT (US)

( * ) Notice: Subject to any disclaimer, the term of this patent is extended or adjusted under 35 U.S.C. 154(b) by 64 days.

(21) Appl. No.: 12/956,956

(22) Filed: Nov. 30, 2010

(51) Int. Cl.
*G01C 15/06* (2006.01)
(52) U.S. Cl. .......................................... 33/293; 33/296
(58) Field of Classification Search ............. 33/293, 33/296, 1 BB, 1 CC
See application file for complete search history.

(56) References Cited

U.S. PATENT DOCUMENTS

| | | | | |
|---|---|---|---|---|
| 678,041 | A * | 7/1901 | Sanderson | 33/296 |
| 3,143,805 | A * | 8/1964 | Clausen | 33/293 |
| 3,314,068 | A * | 4/1967 | Verive | 342/407 |
| 3,808,690 | A * | 5/1974 | Balder | 33/1 CC |
| 4,356,637 | A * | 11/1982 | Hall | 33/296 |
| 4,691,446 | A * | 9/1987 | Pitches et al. | 33/516 |
| 4,803,784 | A * | 2/1989 | Miller | 33/293 |
| 5,457,890 | A * | 10/1995 | Mooty | 33/294 |
| 5,579,585 | A * | 12/1996 | Schaeffer | 33/295 |
| 6,796,043 | B2 * | 9/2004 | Jackson et al. | 33/293 |
| 7,254,895 | B1 * | 8/2007 | O'Donnell | 33/293 |
| 7,818,889 | B2 * | 10/2010 | Bernhard et al. | 33/293 |
| 2006/0042104 | A1 * | 3/2006 | Donaldson et al. | 33/1 BB |

OTHER PUBLICATIONS

Seco Manufacturing Co., Inc., http://www.surveying.com/products/details.asp?prodID=5198-157 and related manufacturing specification sheets (Bracket, Pole, Offset Holder; Holder Kit, Offset Pole) available at link identified on webpage with arrow, Nov. 18, 2010.

* cited by examiner

*Primary Examiner* — Christopher Fulton
(74) *Attorney, Agent, or Firm* — Workman Nydegger

(57) ABSTRACT

Embodiments of the present invention comprise devices, systems, and components for use with a survey pole positioning system. For example, embodiments of the invention provide a survey pole positioning system that efficiently, easily, and safely allows a surveyor to position a survey pole, and thus position a surveying device on a surface where a surveyor cannot directly stand. In one embodiment, a hinged member couples a survey pole to a positioning rod such that the positioning rod can rotate with respect to the survey pole. A surveyor can then use the positioning rod to position the survey pole on a surface where the surveyor cannot directly stand.

33 Claims, 10 Drawing Sheets

SURVEY POLE POSITIONING SYSTEM

BACKGROUND OF THE INVENTION

1. The Field of the Invention The present disclosure is generally related to survey poles. In particular, the present disclosure relates to survey poles and devices for positioning survey poles on survey targets.

2. Background and Relevant Art

Surveying generally refers to the technique and science of accurately determining the terrestrial or three-dimensional position of survey targets or points of interest. In most circumstances, the points of interest may be points on the surface of the earth or points on a man-made structure. Regardless of the type of point of interest, surveying is often used to create accurate maps and records that indicate precise locations of a point of interest.

There are several techniques that modern surveyors use to conduct a survey. One such technique is often referred to as triangulation. With triangulation, distances, elevations, and directions between points of interests can be determined. For example, the surveyor can use the triangulation method to measure and calculate the horizontal distance between two points of interest, as well as the elevation difference between those same points.

To use the triangulation method, surveyors may use various pieces of survey equipment to aid in measuring and calculating the various distances. For example, traditional survey equipment may include a theodolite set on a tripod and a survey pole with a survey prism designed to reflect light. A surveyor may place the theodolite on a position of known location and elevation, and have another surveyor place the survey pole with the survey prism on a point of interest. The survey pole is often a known length and is often used to measure locations near or below the surface of the ground. The surveyors may then use the theodolite in combination with the survey pole and survey prism to measure the necessary distances and angles between the known point and the point of interest such that the surveyors can use the triangulation method to calculate a fairly precise location of the point of interest.

Instead of a survey prism, more modern survey equipment may include what is known as a total station, which may include an electronic distance measurement device and Global Positioning System (GPS) capabilities. Although modern survey equipment has expanded capabilities compared to more traditional survey equipment, the total stations are still mounted to a survey pole such that a surveyor can locate and place the survey equipment on a specific point of interest. Thus, regardless of the surveying technique or surveying equipment, surveyors still largely depend on a surveyor to position a surveying pole on a point of interest in order to calculate a precise location for that point.

The above surveying techniques and equipment can be used in many surveying applications. However, in one particular survey application, a surveyor determines and documents the precise location of welds on underground pipelines. When constructing an underground pipeline, pipe segments are typically welded together within a trench, and before the pipeline is covered, a surveyor simply walks directly on the pipe in order to position the survey pole on each weld along the pipeline, and thereby measures the location of the weld. More recently, however, modern pipe manufacturing techniques, as well as pipeline construction standards and regulations, have prevented a surveyor from walking directly on the pipe. In particular, many underground pipelines are constructed with specialty pipe that includes an anti-corrosive outside layer that can be damaged if a surveyor were to walk directly on the pipeline.

Attempts to position the survey pole on the pipeline welds without walking directly on the pipe may result in various problems. For example, if a surveyor attempts to stand at the side of the trench while holding the survey pole in a vertical position over the pipeline weld, the surveyor may be prone to dropping the survey pole, and thus damaging the surveying device (e.g., the survey prism or total station). Surveying devices are not only expensive to replace or repair, but if the surveying device is damaged, the entire pipeline project may be delayed for the amount of time it takes to replace or repair the surveying equipment. The delay in the pipeline project can cause logistical issues, as well as cause a significant financial loss. Also, it may be difficult or impossible for the surveyor to reach far enough over the trench to vertically position the pole, resulting in an inaccurate reading.

Moreover, when measuring pipelines may be located within a trench, attempts to measure the welds without walking directly on the pipe may cause the trench to collapse. Collapsing a trench can be dangerous to surveyors and other pipeline construction personnel. Furthermore, a collapsed trench on a pipeline may also be costly in both time and money as the pipeline may have to be unburied.

Thus, there are several disadvantages in the art of surveying pipeline welds or other similar points of interest that are located in an area where a surveyor cannot directly stand.

BRIEF SUMMARY OF THE INVENTION

Embodiments of the present invention comprise devices, systems, and components for use with a survey pole positioning system. For example, embodiments of the invention provide a survey pole positioning system that efficiently, easily, and safely allows a surveyor to position a survey pole, and thus position a surveying device on a surface where a surveyor cannot directly stand. In one embodiment, a hinged member couples a survey pole to a positioning rod such that the positioning rod can rotate with respect to the survey pole. A surveyor can then use the positioning rod to position the survey pole on a surface where the surveyor cannot directly stand.

In one example embodiment, a survey pole positioning system includes a survey pole having a first survey pole end and a second survey pole end. The survey pole positioning system can further include a hinged member having a first element and a second element connected by a rotatable hinge, the first element of the hinged member being coupled to the second survey pole end of the survey pole. Additionally, the survey pole positioning system can include a positioning rod having a first positioning rod end and a second positioning rod end, and the second positioning rod end coupled to the second element of the hinged member.

In another example embodiment, a hinged member for use with a surveying pole position system includes a first element having a first fastener and a hinge operatively associated with the first element. The hinged member can further include a second element having a second fastener, wherein the second element is rotatably coupled to the hinge such that the second element can rotate with respect to the first element.

Also, in another example embodiment, a survey pole positioning device can include a hinged member having a first element and a second element with the first element and the second element rotatably connected to one another. The survey pole positioning device further can include a surveying device mounted to the first element of the hinged member and a survey pole coupled to the first element of the hinged member such that the surveying device is positioned along a centerline axis of the survey pole. The survey pole positioning device can further include a positioning rod coupled to the second element of the hinged member such that the positioning rod can rotate with respect to the survey rod.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
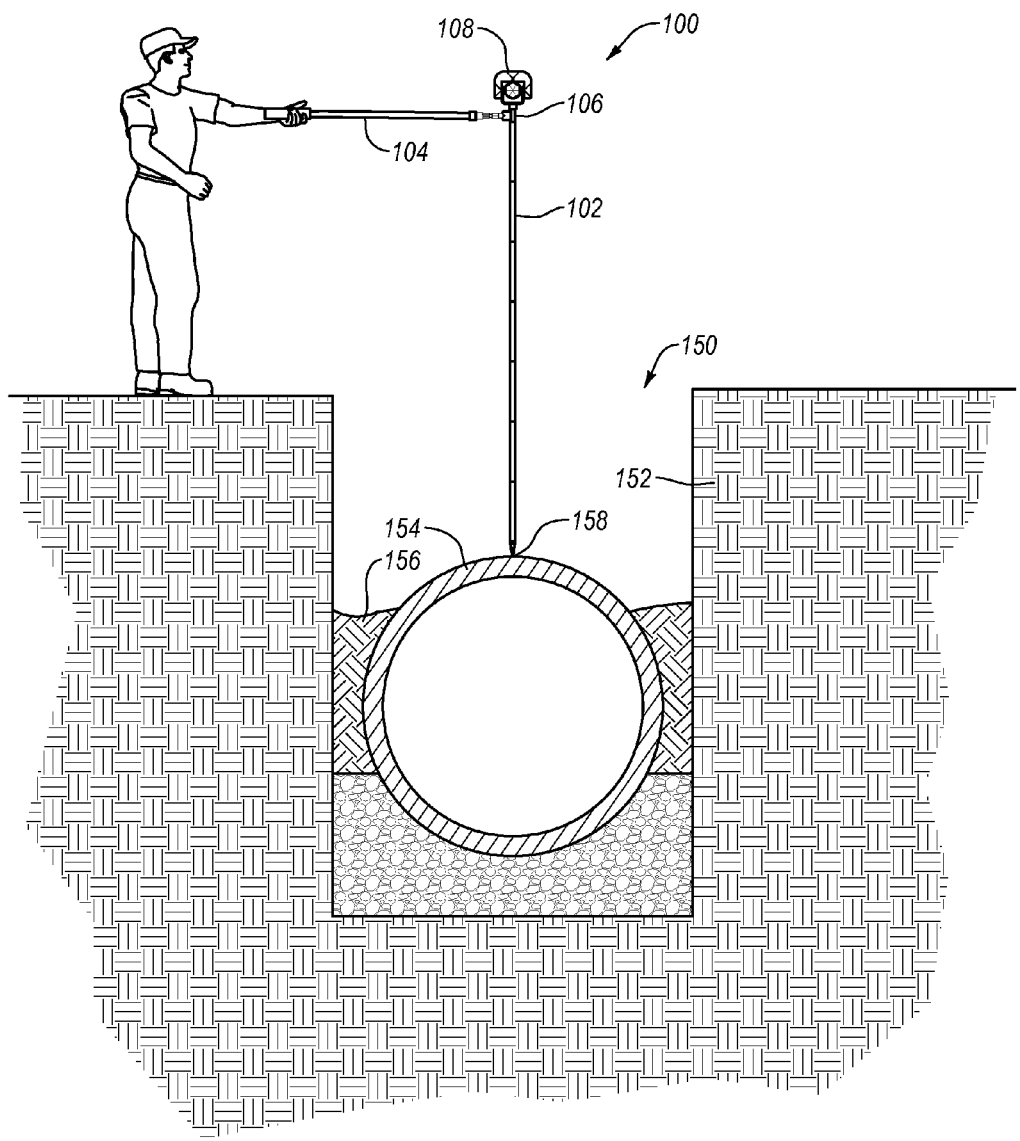
FIG. 1A illustrates a cross-sectional view of an example survey pole positioning system in accordance with the present invention in use on a pipeline.

Embodiments of the present invention comprise devices, systems, and components for use with a survey pole positioning system. For example, embodiments of the invention provide a survey pole positioning system that efficiently, easily, and safely allows a surveyor to position a survey pole, and thus position a surveying device on a surface where a surveyor cannot directly stand. In one embodiment, a hinged member couples a survey pole to a positioning rod such that the positioning rod can rotate with respect to the survey pole. A surveyor can then use the positioning rod to position the survey pole on a surface where the surveyor cannot directly stand.

In particular, embodiments of the present invention can overcome disadvantages in conventional survey pole positioning. As mentioned, unlike conventional survey equipment, a survey pole positioning system according to example embodiments of the present invention can allow a surveyor to position a survey pole on a surface in which the surveyor is not allowed to walk or stand. In addition, the survey pole positioning system can allow a surveyor to easily and confidently position the survey pole such that the risk of dropping the survey pole and damaging a surveying device is greatly reduced. Moreover, in the case of surveying a point of interest in a trench, example embodiments of the survey pole positioning system allow a surveyor to stand clear of the edge of the trench, thereby decreasing the possibility of the trench caving in and causing injury to the surveyor.

FIG. 1 illustrates one example embodiment of a survey pole positioning system 100. As discussed above, the survey pole positioning system 100 can be used when surveying a point of interest that is on a surface that a surveyor cannot stand. For example, FIG. 1 illustrates that a surveyor can use the survey pole positioning system 100 to survey a point of interest 158 on a pipeline 154 within a trench 150. The trench 150 can include steep trench walls 152 and can be at least partially filled with backfill 156. In particular, the pipeline 154 can include an anti-corrosive coating or other characteristics that do not allow the surveyor to stand directly on the pipeline 154. Moreover, the trench wall 152 of the trench 150 can have a steep grade such that a surveyor has to stand a certain distance from the trench 150 to avoid collapsing the trench wall 152.

FIG. 1A illustrates only one application in which a surveyor can use the survey pole positioning system 100. However, a surveyor can use the survey pole positioning system 100 for any surveying application in which the surveyor cannot stand on the same surface as the point of interest 158. Moreover, a surveyor can use the survey pole positioning device 100 in an application in which the point of interest 158 is located in an area that is difficult for the surveyor to access. For example, a surveyor can survey a point of interest 158 located on ledges of man-made structures such as bridges, damns, or buildings with the survey pole positioning system 100, while at the same time maintaining a safe distance from the ledge.

Depending on the surveying application, the point of interest 158 can vary from one surveying application to the next. FIG. 1 illustrates that the point of interest 158 can be a particular location on the pipeline 154. In particular, the point of interest 158 can be a weld that connects two pieces of pipe together to form the pipeline 154. In other example embodiments, the point of interest 158 can be any particular location, located on land or on a man-made structure, that a surveyor desires to survey to determine a precise location.

In the event that a surveyor is surveying a point of interest 158 located within the trench 150, as illustrated in FIG. 1A, the dimensions and size of the trench 150 can vary from one surveying application to the next depending on the size of the pipeline 154. For example, the pipeline 154 cross-sectional dimension can range from about two feet to about ten feet. As such, the width of the trench 150 can range between about five feet to about thirty feet, depending on the size of the pipeline and any additional structure(s) that is included in the trench 150. Of course, a surveyor can use the survey pole positioning device 100 with pipelines of greater or smaller dimensions that are associated with trenches that can be almost any width.

Notwithstanding the dimensions and characteristics of the environment around the point of interest 158, FIG. 1A illustrates an example of a surveyor using an example embodiment of the surveying pole positioning system 100 to survey the point of interest 158. In particular, FIG. 1A shows that the surveying pole positioning system 100 can include a survey pole 102 and a positioning rod 104 that are coupled together by way of a hinged member 106. A surveying device 108 can then be attached to the hinged member 106 such that the surveying device 108 is located directly above the survey pole 102 (e.g., along the centerline axis of the survey pole 102).

As shown in FIG. 1A, a surveyor can hold one end of the positioning rod 104 and position the survey pole 102 directly on the point of interest 158 located within the trench 150. The hinged member 106 allows the surveyor to pull or push the positioning rod 104 such that the survey pole 102 is substantially perpendicular to the surface where the point of interest 158 is located. While holding the survey pole 102 in this position, the surveying device 108 attached to the hinged member 106 can be used to take a surveying measurement such that the precise location of the point of interest 158 can be determined.

As shown, the survey pole positioning system 100 allows the surveyor to stand in a permitted location (e.g., not on the pipeline 154) as well as a safe location (e.g., not in the trench 150 or on the edge of the trench 150). Moreover, because the survey pole 102 is operatively associated with the positioning rod 104 by way of the hinged member 106, a surveyor can efficiently position the survey pole 102 on the point of interest 158 securely without the risk of dropping the survey pole 102 and damaging the surveying device 108. Thus, a surveyor can survey the point of interest 158 relatively safely and efficiently when compared to conventional methods.

Figure 1B:
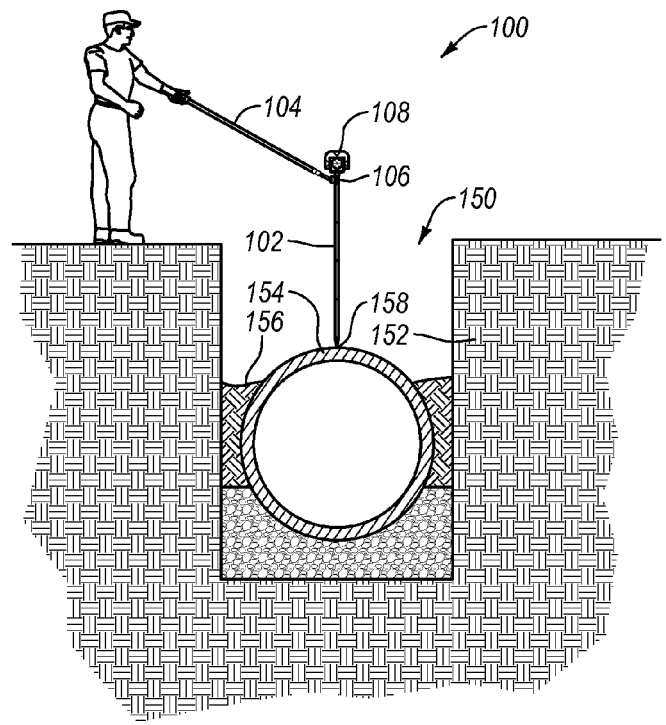
FIGS. 1B-1C illustrate the example survey pole positioning system shown in FIG. 1A in use in various terrain.
Figure 1C:
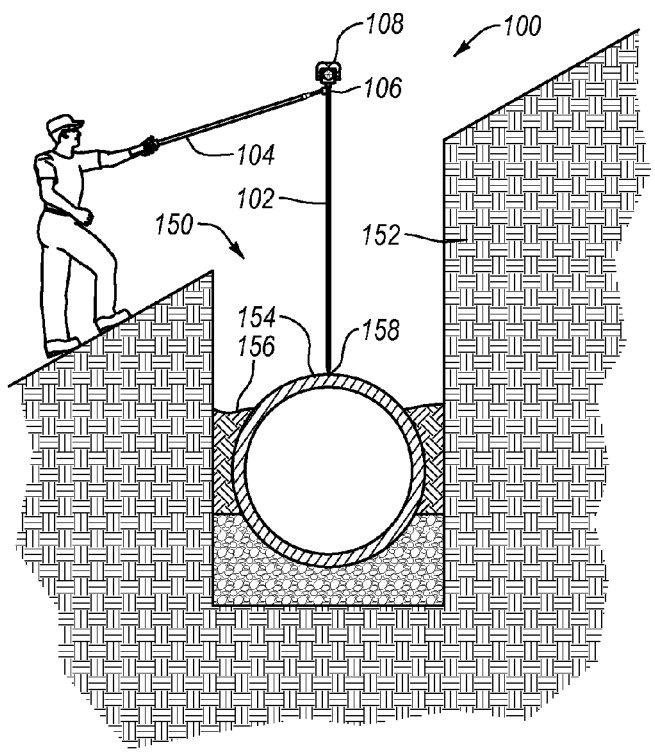

Similar to FIG. 1A, FIGS. 1B and 1C illustrate additional applications in which a surveyor can use the survey pole positioning system 100 to survey a point of interest 158 located within a trench 150. In particular, FIG. 1B illustrates a situation in which the point of interest 158 located on the pipeline 154 is located further below the surface on which the surveyor stands compared to the situation illustrated in FIG. 1A. Due to the fact that the positioning rod 104 and the survey pole 102 are joined by the hinged member 106, the positioning rod 104 can rotate with respect to the survey pole 102, as shown in FIG. 1B. Thus, the hinged member 106 allows a surveyor to angle the positioning rod 104 upward such that the survey pole 102 is positioned on the point of interest 158 and oriented substantially perpendicular to the surface on which the point of interest 158 is located.

In contrast to FIG. 1B, FIG. 1C illustrates a situation in which the point of interest 158 located on the pipeline 154 is located relatively closer to the surface on which the surveyor stands compared to the situation illustrated in FIG. 1A. As illustrated in FIG. 1C, for example, the trench 150 can be constructed on a hillside. As described above, the hinged member 106 permits the positioning rod 104 to rotate with respect to the survey pole 102. Therefore, the hinged member 106 allows a surveyor to angle the positioning rod 104 downward such that the survey pole 102 is positioned on the point of interest 158 and oriented substantially perpendicular to the surface on which the point of interest 158 is located.

The degree of rotation of the positioning rod 104 with respect to the survey pole 102 can vary from one embodiment to the next. For example, in one embodiment the positioning rod 104 can rotate about 180 degrees with respect to the survey pole 102 (see detail of hinged member 106 in FIGS. 4A through 4D). In an alternative embodiment, the positioning rod 104 can rotate a full 360 degrees with respect to the survey pole 102. The full 360 degree rotation can be accomplished by using an offset hinged member 106 such that the positioning rod 104 is offset from the survey pole 102 such that the positioning rod 104 can rotate a full 360 degrees without contacting the survey pole 102.

Due to the fact that a surveyor can use the survey pole positioning system 100 in a variety of terrain and environments that create various angles of the positioning pole 104 with respect to the survey pole 102, the survey pole positioning system 100 can include one or more features that assist the surveyor in ensuring that the survey pole 102 is plumb (i.e., substantially vertical with respect to the point of interest 158). For example, the survey pole positioning system 100 can include visual indicators, such as a bubble level, that the surveyor can view to determine when the survey pole 102 is plumb. Alternatively, the survey pole positioning system 100 can include electronic leveling devices that emit a sound and/or illuminate a light when the survey pole 102 reaches a plumb position.

Figure 2:
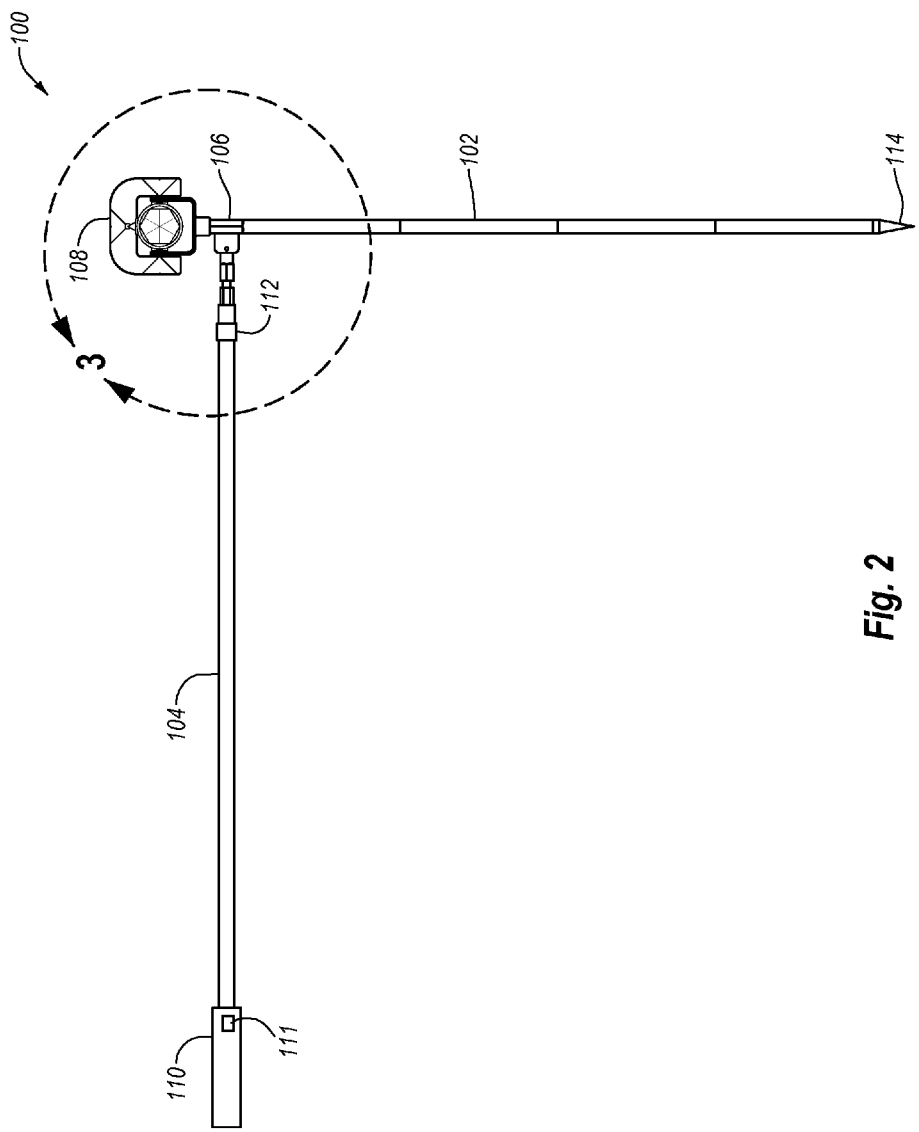
FIG. 2 illustrates a plan view of an example survey pole positioning system in accordance with the present invention.

FIG. 2 further illustrates various characteristics of the survey pole positioning system 100 that can be used to adapt to various terrain and environments. For example, FIG. 2 illustrates that the survey pole 102 can include a plurality of interchangeable segments such that a surveyor can change the length of the survey pole 102 depending on the position of the point of interest 158. For example, FIG. 2 shows that the survey pole 102 that includes four interchangeable segments. A surveyor can remove one or more interchangeable segments such that the survey pole 102 becomes shorter in length, or alternatively, the survey can add addition segments such that the survey pole 102 becomes longer in length. The survey pole 102 can have almost any number of interchangeable segments allowing a surveyor to customize the total length of the survey pole 102 as needed.

In addition to varying the number of interchangeable segments included on the survey pole 102, the lengths of the individual interchangeable segments can vary from one embodiment to the next and/or from one interchangeable segment to the next on the same survey pole 102. The length of an individual interchangeable segment can be almost any length, but generally the length of the individual interchangeable segments range from about one foot to about six feet. In one example embodiment, the entire survey pole 102 is made from a single segment that attaches to the hinged member 106.

In addition to the various lengths of the survey pole 102, the cross-sectional geometric configuration and dimension can vary. For example, FIG. 2 illustrates that the cross-sectional configuration of the survey pole 102 is substantially circular. In alternative embodiments, however, the survey pole 102 can have a triangular, square, rectangular, oval, or almost any cross-sectional geometric configuration. Moreover, the cross-sectional dimension of the survey pole 102 can vary from one embodiment to the next, or within the same survey pole 102. The cross-sectional dimension of the survey pole 102 can be almost any size, but generally, the survey pole 102 can have a cross-sectional dimension that ranges from about 0.5 inches to about two inches.

The survey pole 102 can also include a tip 114 segment that is configured to effectively interface with the point of interest 158. For example, FIG. 2 illustrates that the tip 114 can have a substantially conical geometric configuration that ends in a point such that a surveyor can place the point of the tip 114 directly and precisely on the point of interest 158. Depending on the nature of the point of interest, the tip 114 can have alternative configurations. For example, if the point of interest is fragile, the tip can include a soft rubber ball on the tip 114 such that the point of interest 158 can be surveyed with minimal damage. If the point of interest is metal, the tip 114 can include a magnet. A magnetic tip 114 can help prevent the tip 114 from sliding off of a desired point of interest 158. A magnetic tip can also assist a surveyor to position the survey pole 102 in a plumb position. The tip 114 can simply be an interchangeable segment that a surveyor can easily change in the field depending on the nature of the point of interest 158.

Notwithstanding the size and geometric configuration of the survey pole 102, the way in which the interchangeable segments of the survey pole 102 can connect and disconnect from one another can vary. For example, the individual interchangeable segments that include a threaded post on one end and a threaded port on the opposite end such that the threaded post on one end of a first interchangeable segment can be screwed into the threaded port on a second interchangeable segment. In alternative embodiments, the interchangeable segments can include quick-connect clips, snap fits, or other similar interlocking features that securely connect each individual interchangeable segment while allowing a surveyor to disconnect the individual interchangeable segments to customize the total length of the survey pole 102.

As described with reference to the survey pole 102, the positioning rod 104 can also include all the various characteristics as described with reference to the survey pole 102. For example, the positioning rod 104 can have similar dimensions, geometric configurations, and interchangeable segments as described with respect to the survey pole 102. Additionally, the positioning rod 104 can have other characteristics that allow a surveyor to efficiently use the survey pole positioning system 100.

For example, FIG. 2 illustrates that the positioning rod 104 can include a handle 110. As shown, the handle 110 can be positioned on the end of the positioning rod 104 opposite of the hinged member 106. The handle 110 can be made from a material that is easy to grip (e.g., rubber) such that a surveyor can maneuver the survey pole positioning system 100 and easily position the survey pole 102 on the point of interest 158.

In some embodiments, the handle 110 can further include controls that are communicably connected (either through wires or wireless) to the surveying device 108 such that the surveyor positioning the survey rod 102 can also control the surveying device 108. For example, in one example embodiment, the survey device 108 is a total station with GPS capabilities. The surveyor can position the survey pole 102 and then press a control or button 111 (see FIG. 2) on the handle 110 that prompts or starts the GPS enabled survey device 108 to calculate and record the survey data at the moment that the surveyor has properly positioned the survey pole 102.

Figure 3A:
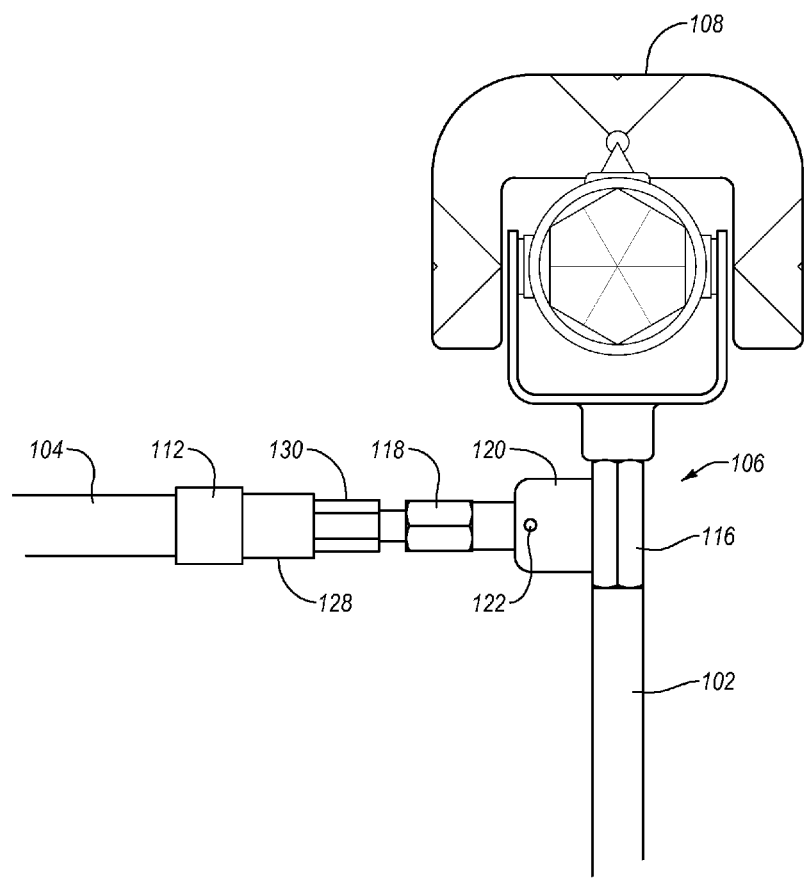
FIG. 3A illustrates a zoomed in view a hinged member shown in FIG. 2.

The positioning rod 104 can have an extendable configuration that can also be controlled by the handle 110. For example, and as illustrated in FIG. 3, the positioning rod 104 can have an extendable configuration wherein the positioning rod includes an outer rod 128 and an inner rod 130 that can slide in and out of the outer rod 128. In particular, as the inner rod 130 slides out of the outer rod 128, the positioning rod 104 can extend to have a longer length. Similarly, as the inner rod 130 slides into the outer rod 128, the positioning rod 104 can shorten in length.

As mentioned, in one example embodiment, the handle 110 can control the extension of the positioning rod 104. For example, the handle 110 can have a first position that puts a compressive force on the inner rod 130, and a second position that releases the compressive force on the inner rod 130. In this way, a surveyor can twist or rotate the handle 110 such that the surveyor moves the handle 110 from the first position to the second position, which allows the surveyor to move the inner rod 130 out of the outer rod 128 and thereby extend the total length of the positioning rod 104. Once the positioning rod reaches a desired length, a surveyor can rotate the handle 110 to apply the compressive force to the inner rod 130 and thereby lock the inner rod 130 in place within the outer rod 128.

As an alternative to having the handle 110 control the extension of the positioning rod 104, the positioning rod can include an extension lock 112. For example, FIG. 3 illustrates that the extension lock 112 can be positioned on the end of the positioning rod 104 nearest the hinged member 106. The extension lock 112 can be a rotatable lock, as described above with the handle. Alternatively, the extension lock 112 can include spring loaded mechanism that biases a pin or similar feature through the outer rod 128 and into a pin slot on the inner rod 130 such that the inner rod is locked in place when the pin from the spring loaded mechanism engages the pin slot on the inner rod 130. Thus, a surveyor can depress a button or similar feature on the extension lock 112 such that the spring bias is overcome and the pin is removed from the pin slot on the inner rod 130, thus allowing the inner rod 130 to slide with respect to the outer rod 128. This type of locking mechanism can also be associated with the handle 110.

Despite the various ways in which the extension lock 112 can function, the positioning rod 104 can extend to various lengths. For example, in one embodiment the positioning rod 104 can extend from a length of about six feet to a length of about 12 feet. However, the positioning rod 104 can have various other lengths up to a fully extended length of about twenty feet or more. Furthermore, although not shown in the figures, the survey pole 102 can include the extendable features as described with respect to the positioning rod 104 and can have various lengths of extension. For example, the survey pole 102 can extend from a length of about four feet to a length of about eight feet.

Depending on the lengths of the survey pole 102 and positioning rod 104, the materials with which the survey pole 102 and positioning rod 104 are made can vary. In one example embodiment, both the survey pole 102 and the positioning rod 104 are made substantially from aluminum or an aluminum alloy. Alternatively, the survey pole 102 and positioning rod 104 can be made from other materials such as hardened plastics, and composite materials. Preferably, the survey pole 102 and position rod 104 are made from rigid light weight materials to allow a surveyor to easily maneuver the survey pole positioning system 100; however, almost any rigid material can be used.

Regardless of the features and characteristics of the survey pole 102 and the positioning rod 104, the hinged member 106 is the component that couples the survey pole 102 to the positioning rod 104 while at the same time supporting the surveying device 108. As mentioned above, the type of surveying device 108 can vary from one embodiment to the next. FIG. 3 illustrates that the surveying device 108 can be a survey prism. Alternatively, the surveying device 108 can be any type of total station models that can include GPS capabilities. The hinged member 106 can be configured such that the type of surveying device 108 mounted to the hinged member 106 can be interchanged depending on the needs of the surveyor.

The way in which the surveying device 108 mounts to the hinged member 116 can vary. For example, the hinged device can include a threaded post that is threaded into a corresponding threaded port on the surveying device 108. Alternatively, the surveying device 108 can mount to the hinged member 106 by way of a clip connector, snap-fit connector, or another similar connection joint that allows a surveyor to interchange the type of surveying device 108. In one example embodiment, the surveying device 108 can be permanently connected to the hinged member 106.

Notwithstanding the connection to the surveying device 108, the hinged member 106 can connect to the survey pole 102 and positioning rod 104 in various ways. For example, FIG. 3 illustrates that one example embodiment of the hinged member 106 includes a first element 116 coupled to the survey pole 102 and a second element 118 coupled to the positioning rod 104. A hinge plate 120 can be immovably connected to the first element 116 to support a hinge 122 whereby the second element 118 is coupled to the hinge plate 120 by way of the hinge 122 such that the first element 116 can rotate with respect to the second element 118.

FIGS. 4A through 4D illustrate additional characteristics and features of one example embodiment of the hinged member 106 in more detail. As mentioned, the hinged member 106 can include the first element 116 that immovably connects to the hinge plate 120. For example, the hinge plate 120 can be welded to the first element 116. Alternatively, the first element and hinge plate 120 can be made from a single piece of material.

Figure 4A:
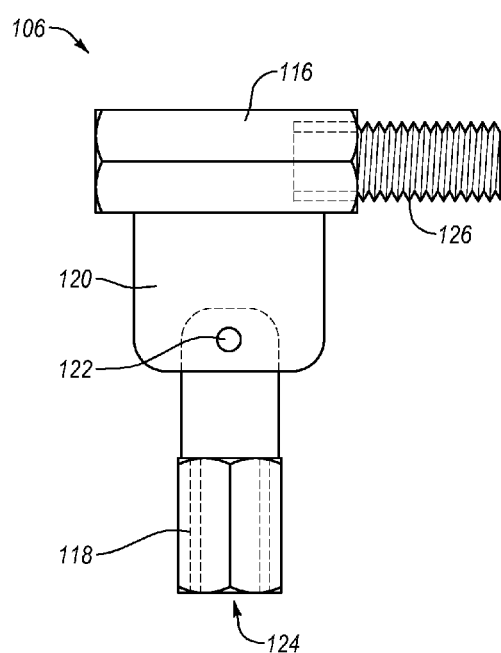
FIG. 4A illustrates a front plan view an example hinged member shown in FIG. 3.
Figure 4B:
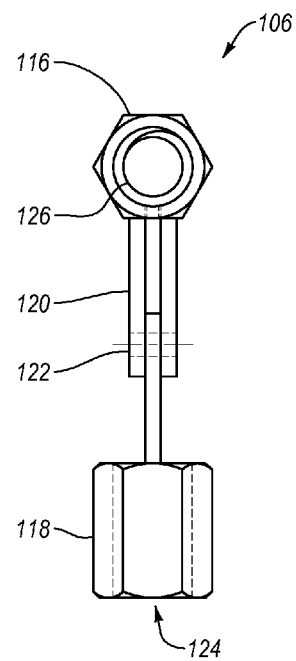
FIG. 4B illustrates a side plan view of an example hinged member shown in FIG. 3.
Figure 4C:
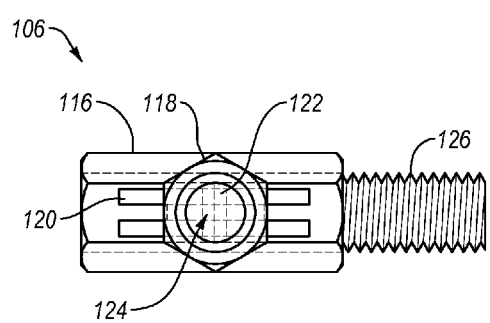
FIG. 4C illustrates a bottom plan view of an example hinged member shown in FIG. 3.
Figure 4D:
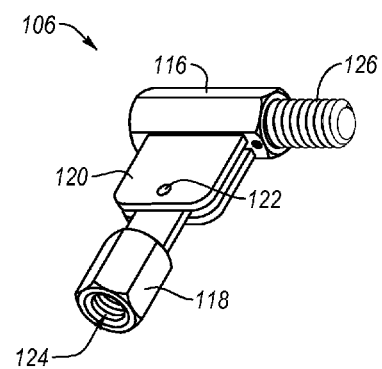
FIG. 4D illustrates a perspective view of an example hinged member shown in FIG. 3.

In one example embodiment, the hinge plate 106 can include two plates that are welded or otherwise attached to the first element 116. For example, FIGS. 4B, 4C and 4D illustrate that the hinge plate 106 includes two plates separated by a gap such that the second element 118 fits in the gap between the two plates. In an alternative embodiment, the hinge plate 106 can simply be a single plate.

The hinge plate 106 can also be specifically configured such that the when a surveyor holds the positioning pole 104 and the survey pole 102 is suspended in the air, the survey pole 102 hangs substantially plumb. This function of having the survey pole 102 hang plumb from the hinged member 106 can be accomplished by moving the hinge 122 closer to the first element 116. In one example embodiment, the hinge 122 is located directly on the first element 116 such that the hinged member 106 does not include a hinge plate 120. Thus, with the fulcrum of the hinge 122 positioned closer to the centerline of the survey pole 102, the survey pole 102 can hang substantially plumb, which can assist a surveyor in properly positioning the survey pole 102.

Figure 3B:
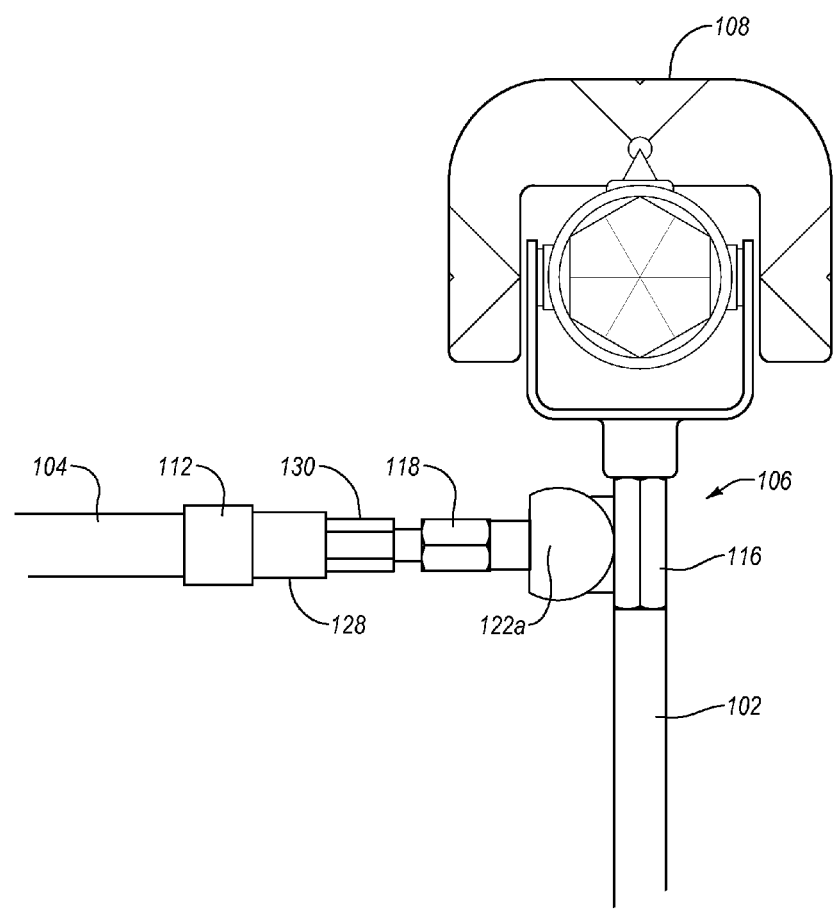
FIG. 3B illustrates a zoomed in view of another hinged member.

In addition, as shown by FIG. 3B, the hinged member 106 can include a ball joint which serves as the hinge 122. The ball joint hinge 122a allows the survey pole 102 to rotate in almost any direction with respect to the positioning rod 104. Moreover, if the ball joint hinge 122a is positioned substantially in line with the centerline axis of the survey pole 102, the survey pole 102 can hang substantially at plumb.

Instead of moving the hinge 122 to the centerline of the survey pole 102, the hinge 122 can include a mechanism that biases the first element 116, and thus the survey pole 102, such that the survey pole 102 hangs from the hinge 122 with a substantially plumb or vertical orientation. For example, the hinge 122 can include a spring that biases the first element 116 and the survey pole 102 to a plumb orientation. In addition, the survey pole 102 can be weighted in order to assist the survey pole 102 to hang in a substantially plumb orientation.

Notwithstanding the various hinge 122 configurations, the first element 116 and second element 118 can respectively connect to the survey pole 102 and positioning rod 104 in a various manners. For example, FIGS. 4A through 4D illustrate that the first element 116 can connect to the survey pole 102 by way of a threaded post 126 that can screw into a corresponding threaded port in the survey pole 102. Similarly, the second element 188 can connect to the positioning rod 104 by way of a threaded port 124 that can accept a threaded post on the positioning rod 104. In an alternative arrangement, the first element 116 and the second element 118 can both have threaded posts or both have threaded ports.

Instead of having a threaded connection between the hinged member 106 and the surveyor pole 102 and positioning rod 104, the first element 116 and second element 118 can have various other connections. For example, the first element 116 and/or second element 118 can have a quick connection type connection wherein pins located on the survey pole 102 and/or positioning rod 104 engage channels located within the first element 116 and/or second element 118. The survey pole 102 and positioning rod 104 can connect to the first element 116 and second element 118 in various other similar ways such as clips, bolts, screws, securing pins, slip fit, and any other suitable connection.

Figure 5:
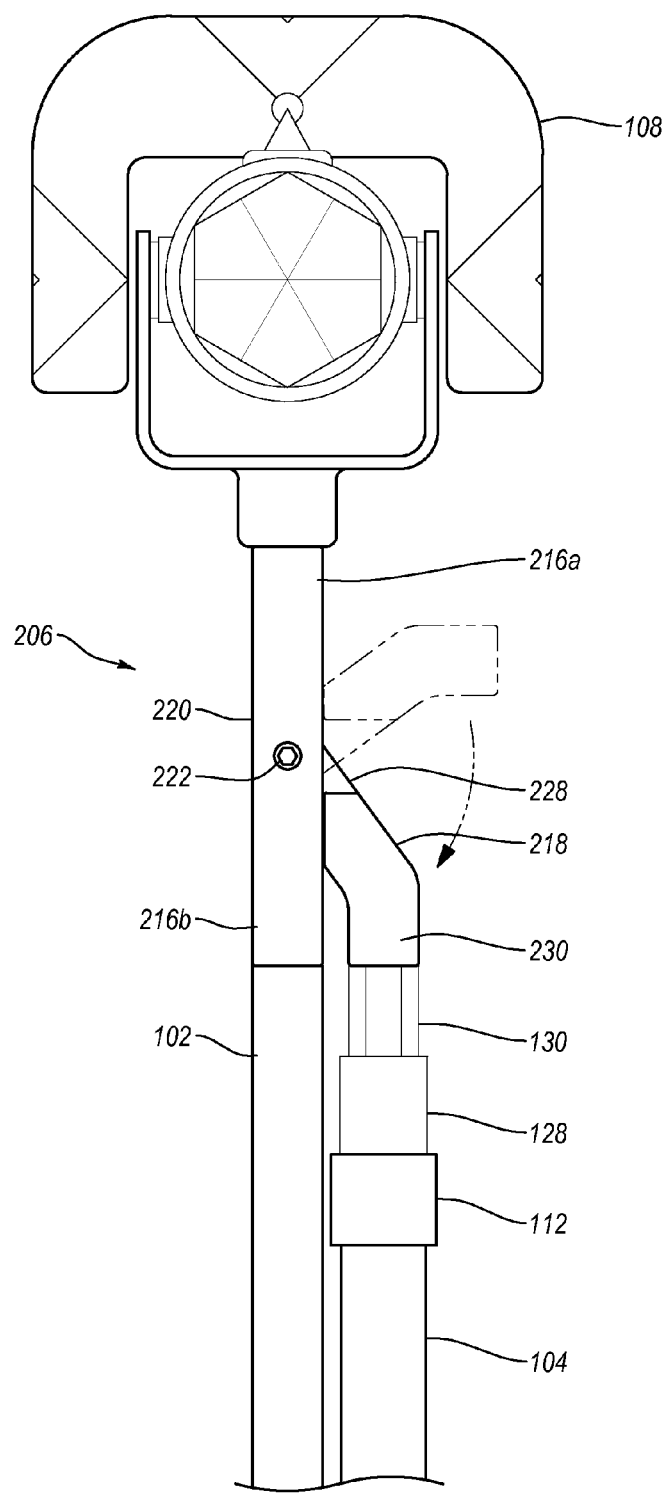
FIG. 5 illustrates an additional embodiment of a hinged member attached to a survey pole positioning device.

FIG. 5 illustrates an alternative configuration in which the hinge is positioned directly along the center line of the survey pole 102. In particular, FIG. 5 illustrates another example implementation of a hinged member 206 having a hinge plate 220 and a second element 218 rotatably connected together by hinge 222. The hinge plate 220 has an upper end 216a that connects to survey device 108 and a lower end 216b that connects to survey pole 102. Second element 218 has a first end 230 that connects to positioning rod 104 and a second end 228 that rotatably connects to hinge plate 220 at hinge 222, which is located directly along the center line of survey pole 102. As described previously, the positioning rod 104 can have an extendable configuration wherein the positioning rod includes an outer rod 128 and an inner rod 130 that can slide in and out of the outer rod 128. The positioning rod 104 can also include an extension lock 112.

Because the hinge 222 is located directly along the center line of the survey pole 102, a surveyor can hold the positioning rod 104 at almost any orientation, and the survey pole 102 will hang substantially plumb with respect to vertical. This configuration will aid a surveyor to insure that the survey device 108 is positioned directly above a point of interest.

In addition, due to the fact that the upper end 216a and lower end 216b of hinge plate 220 are separated on hinge plate 220, the second element 218 is allowed to rotate freely about hinge 222 at a number of different angles without interference.

Figure 6:
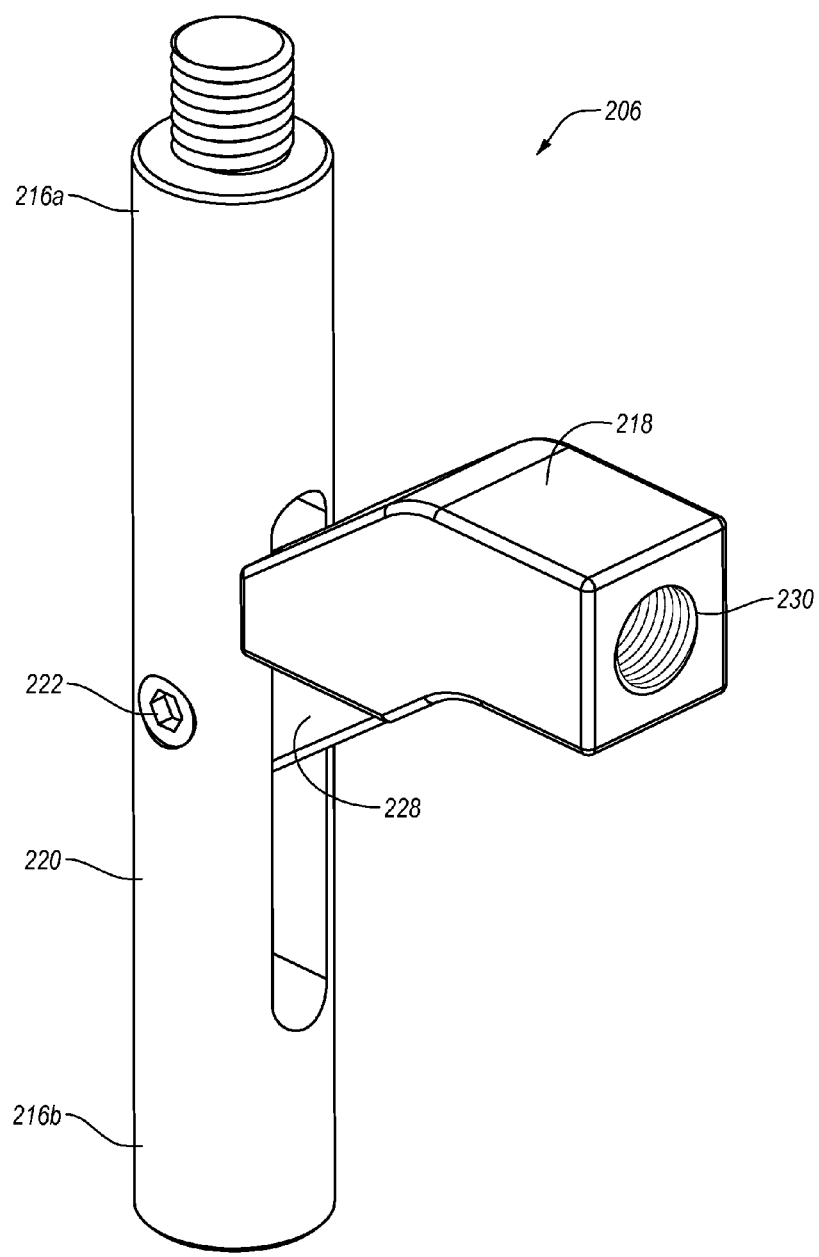
FIG. 6 illustrates a perspective view of an example hinged member shown in FIG. 5.

In addition, second element 218 is shaped in a way that allows for increased rotation around hinge 222. Indeed, in the embodiment shown in FIG. 5, second element 218 is shaped in a way that positioning rod 104 can rotate down to a position that is parallel with survey pole 102. FIG. 6 is a perspective view of hinged member 206. Any number of different shapes of second element 218 could be implemented to make rotation to the aforementioned parallel configuration possible. Among other benefits, this configuration facilitates the collapse and transportation of the survey pole positioning system and helps to avoid damage to hinge 222 and other components of the system.

Although the hinge plate 220 illustrated in FIGS. 5 and 6 is cylindrical, in alternative implementations the hinge plate 220 can have any geometric configuration so long as the hinge plate 220 separates the upper end 216a and lower end 216b to allow the second element 218 to rotate about the hinge.

Figure 7:
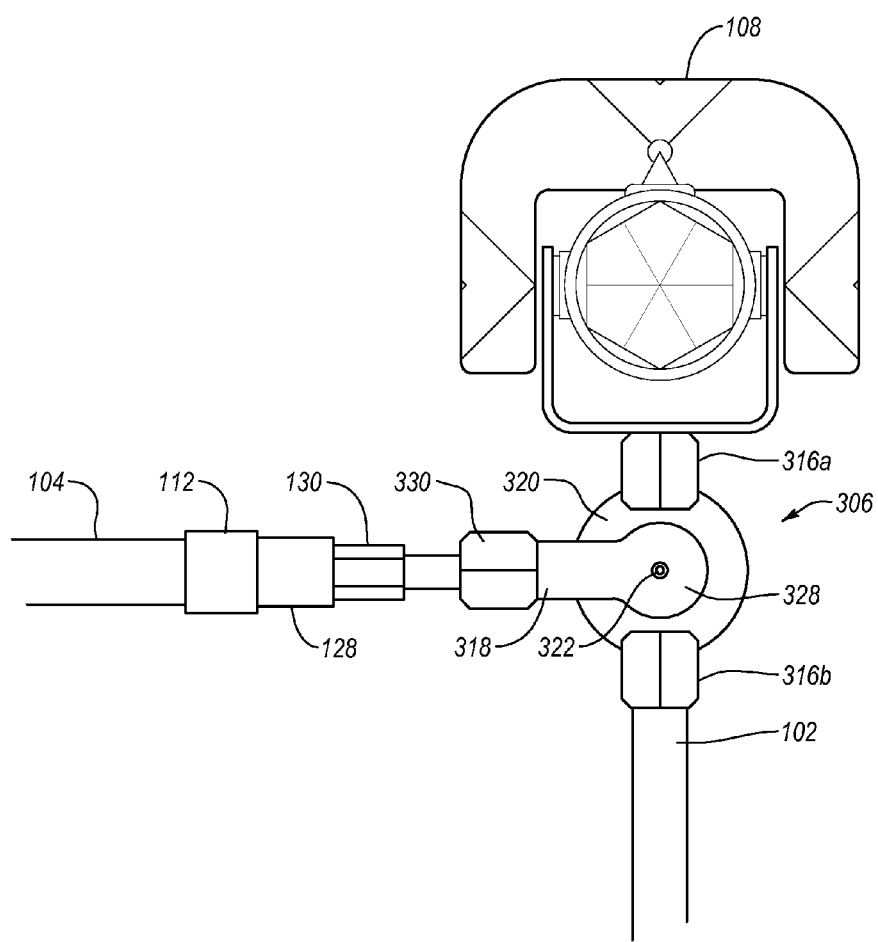
FIG. 7 illustrates an additional embodiment of a hinged member attached to a survey pole positioning device.

For example, FIG. 7 shows a second alternative configuration in which the hinge is positioned directly along the center line of the survey pole 102. In particular, FIG. 7 illustrates another example implementation of a hinged member 306 that includes a hinge plate 320 and a second element 318 rotatably connected together by hinge 322. The hinge plate 320 has an upper end 316a that connects to survey device 108 and a lower end 316b that connects to survey pole 102. Second element 318 has a first end 330 that connects to positioning rod 104 and a second end 328 that rotatably connects to hinge plate 320 at hinge 322, which is located directly along the center line of survey pole 102.

In one implementation, the material from which the hinged member 306 is made is a light-weight material that does not add any significant weight to the overall survey pole positioning system. Furthermore, the thickness of the hinge plate 320 and second end 328 of the second element 218 can be minimized. In one example implementation the thickness of the hinge plate 320 and the second end 328 of the second element 218 are each less than 0.25 inches (6.35 mm) thick.

Figure 8A:
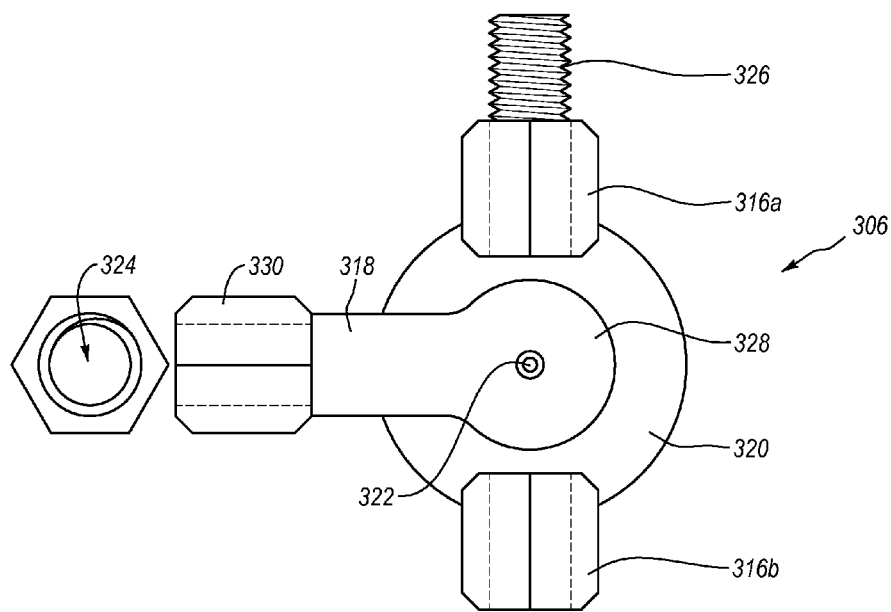
FIGS. 8A-8C illustrate additional views of the hinged member illustrated in FIG. 7.
Figure 8B:
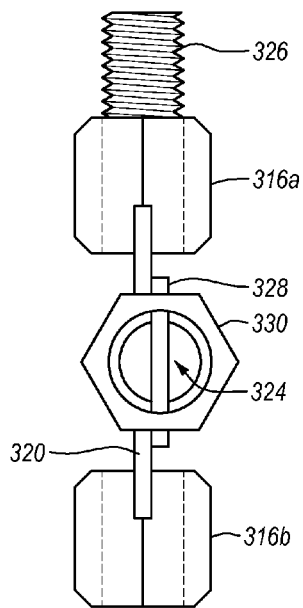
Figure 8C:
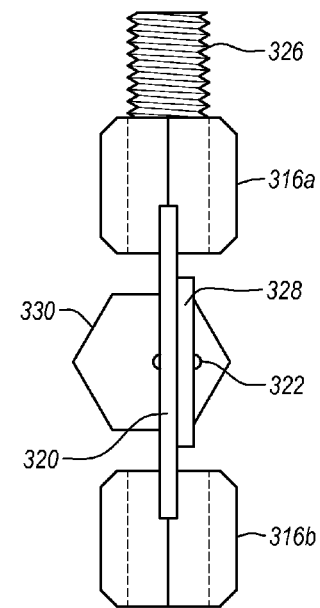

As FIG. 7 illustrates, the hinged member 306 attaches to the other components of the survey pole positioning system 100 as explained above. In particular, FIGS. 8A through 8C illustrate the various features that allow the hinged member 306 to attach to the survey pole positioning system 100. For example, FIG. 8A illustrates that the second element 318 can include a first end 330 that includes a threaded port 324. The positioning rod 104 can have a mating threaded post that couples with threaded port 326. Similarly, the lower end 316b of hinge plate 320 can include a threaded port that couples with a threaded post on the survey pole 102.

In addition, the upper end 316a of hinge plate 320 can include a threaded post 326 that couples to a mating threaded port that can be included on or in the survey device. Of course, the way in which the hinged member 306 couples to the various survey pole positioning system components can vary. For example, the variations discussed with reference to the hinged member 106 described above can also apply to the hinged member 206 and hinged member 306.

The present invention thus can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A system for use by a surveyor in positioning a survey pole, comprising:
   a survey pole having a first end and a second end, the first end of the survey pole configured to be placed on a point of interest to be surveyed;
   a member having a first element and a second element, the first element of the member coupled to the second end of the survey pole;
   a positioning rod having a first end and a second end, the first end of the positioning rod configured to be held by the surveyor, and the second end of the positioning rod coupled to the second element of the member;
   a surveying device mounted to the first element of the member;
   wherein the first element of the member comprises a top end and a bottom end, and wherein the second end of the survey pole is mounted to the bottom end of the first element and the surveying device is mounted to the top end of the first element.

2. The system recited in claim 1, wherein the member comprises a rotatable hinge that connects the first element and the second element of the member.

3. The survey pole positioning system recited in claim 2, wherein the member includes a hinge plate on which the rotatable hinge is located.

4. The survey pole positioning system recited in claim 2, wherein the rotatable hinge located on the member is a ball joint.

5. The survey pole positioning system recited in claim 2, wherein the rotatable hinge is positioned along a centerline axis of the survey pole.

6. The survey pole positioning system recited in claim 5, wherein the first element is separated into an upper end and a lower end such that the hinge is positioned between the upper end and the lower end.

7. The survey pole positioning system recited in claim 6, wherein the second element of the member is shaped such that the positioning rod can be rotated to a configuration in which the positioning rod is parallel to the survey pole.

8. The survey pole positioning system recited in claim 7, wherein the hinge plate has a circular geometric configuration.

9. The system recited in claim 1, wherein:
   the second end of the survey pole comprises a threaded port; and
   the first element of the member comprises a threaded post engageable with the threaded post on the first element of the member.

10. The survey pole positioning system recited in claim 1, wherein:
    the second end of the positioning rod comprises a threaded post; and
    the second element of the member comprises a threaded port engageable with the threaded post on the second element of the member.

11. The system recited in claim 1, wherein the positioning rod includes an outer rod telescopically associated with an inner rod such that the total length of the positioning rod can be extended or shortened by sliding the inner rod out of or into the outer rod.

12. The system recited in claim 11, wherein the positioning rod includes a handle portion with a locking mechanism that can prevent sliding the inner rod out of or into the outer rod.

13. The system recited in claim 12, wherein the locking mechanism comprises a first position and second position, wherein when in the first position the locking mechanism engages the inner rod with a pin such that the inner rod is immobilized within the outer rod, and wherein when in the second position the pin of the locking mechanism disengages the inner rod such that the inner rod can slide within the outer rod.

14. The system recited in claim 13, wherein the handle on the positioning rod further includes a button by which a surveyor can prompt the surveying device to take a survey measurement.

15. The system recited in claim 1, wherein the positioning rod has a length of four feet or more.

16. The system recited in claim 1, wherein the first element and the second element of the member have a hexagonal configuration.

17. The system recited in claim 1, wherein the survey pole includes a magnetic tip at the first end.

18. A system for use by a surveyor in positioning a survey pole, comprising:
    a survey pole having a first end and a second end, the first end of the survey pole configured to be placed on a point of interest to be surveyed;

a member having a first element and a second element, the first element of the member coupled to the second end of the survey pole; and a positioning rod having a first end and a second end, the first end of the positioning rod configured to be held by the surveyor, and the second end of the positioning rod coupled to the second element of the member;

wherein:

the second end of the survey pole comprises a threaded port; and the first element of the member comprises a threaded post engageable with the threaded post on the first element of the member.

19. A system for use by a surveyor in positioning a survey pole, comprising:

a survey pole having a first end and a second end, the first end of the survey pole configured to be placed on a point of interest to be surveyed;

a member having a first element and a second element, the first element of the member coupled to the second end of the survey pole; and a positioning rod having a first end and a second end, the first end of the positioning rod configured to be held by the surveyor, and the second end of the positioning rod coupled to the second element of the member;

wherein:

the positioning rod includes an outer rod telescopically associated with an inner rod such that the total length of the positioning rod can be extended or shortened by sliding the inner rod out of or into the outer rod;

the positioning rod includes a handle portion with a locking mechanism that can prevent sliding the inner rod out of or into the outer rod;

the locking mechanism comprises a first position and second position;

when in the first position the locking mechanism engages the inner rod with a pin such that the inner rod is immobilized within the outer rod, when in the second position the pin of the locking mechanism disengages the inner rod such that the inner rod can slide within the outer rod;

the handle on the positioning rod further includes a button by which a surveyor can prompt the surveying device to take a survey measurement.

20. A member that connects a survey pole with a positioning rod in a survey pole position system, comprising:

a first element having a first fastener; and a second element having a second fastener, wherein the second element is coupled to the first element;

wherein:

the first fastener is either a threaded post or a threaded port; and the second fastener is either a threaded post or a threaded port.

21. The member recited in claim 20, wherein the first element further comprises a third fastener such that the survey pole couples with the first fastener and a surveying device couples with the third fastener such that the first element of the member is between the survey pole and the surveying device.

22. The member recited in claim 21, further comprising a hinge positioned between the first element and the second element such that the first element rotates with respect to the second element.

23. The member recited in claim 22, wherein the hinge is a ball joint.

24. The member recited in claim 22, wherein the hinge is a pin that extends through a hinge plate that is immovably coupled to the first element.

25. The member recited in claim 22, wherein the hinge is positioned on the member such that the hinge is located along the centerline axis of the survey pole.

26. The member recited in claim 25, wherein the positioning rod couples to the second fastener of the second element.

27. The member recited in claim 26, wherein the second element is shaped such that the positioning rod can be rotated to a configuration in which the positioning rod is parallel to the survey pole.

28. A device for use by a surveyor in positioning a survey pole, comprising:

a hinged member having a first element and a second element, wherein the first element and the second element are rotatably connected to one another;

a surveying device mounted to the first element of the hinged member;

a survey pole coupled to the first element of the hinged member such that the first element is positioned between the survey pole and the surveying device; and a positioning rod coupled to the second element of the hinged member such that the positioning rod can rotate with respect to the survey rod.

29. The device recited in claim 28, wherein the first element and the second element are rotatably connected to one another by way of a hinge pin.

30. The device recited in claim 29, wherein the hinge pin is located along the centerline axis of the survey pole.

31. The member recited in claim 30, wherein the second element of the hinged member is shaped such that the positioning rod can be rotated to a configuration in which the positioning rod is parallel to the survey pole.

32. The device recited in claim 28, wherein the positioning rod has a length of four feet or more.

33. The device recited in claim 32, wherein the positioning rod includes an outer rod telescopically associated with an inner rod such that the total length of the positioning rod can be extended or shortened by sliding the inner rod out of or into the outer rod.

* * * * *